(12) United States Patent
Taguchi et al.

(10) Patent No.: US 7,289,267 B2
(45) Date of Patent: Oct. 30, 2007

(54) POLARIZING BEAM SPLITTER (75) Inventors: Tomokazu Taguchi, Sakai (JP); Kazuyuki Nishi, Sakai (JP); Takuji Hatano, Suita (JP); Kazuhiko Ishimaru, Kaizuka (JP)

(73) Assignee: Konica Minolta Opto, Inc., Tokyo (JP)

(*) Notice: Subject to any disclaimer, the term of this patent is extended or adjusted under 35 U.S.C. 154(b) by 53 days.

(21) Appl. No.: 10/902,321

(22) Filed: Jul. 29, 2004

(65) Prior Publication Data
US 2005/0024725 A1 Feb. 3, 2005

(30) Foreign Application Priority Data
Aug. 1, 2003 (JP) ............... 2003-284722

(51) Int. Cl.
*G02B 5/30* (2006.01)

(52) U.S. Cl. ...................... 359/495; 359/494

(58) Field of Classification Search ............ None
See application file for complete search history.

(56) References Cited

U.S. PATENT DOCUMENTS 5,973,835 A * 10/1999 Tsou et al. ............... 359/495
6,014,255 A * 1/2000 Van Der Wal et al. ..... 359/487
6,096,375 A * 8/2000 Ouderkirk et al. ........ 427/163.1

FOREIGN PATENT DOCUMENTS

JP 08-146218 6/1996
JP 09-184916 7/1997

* cited by examiner

*Primary Examiner*—Stephone B. Allen
*Assistant Examiner*—Derek S. Chapel
(74) *Attorney, Agent, or Firm*—Brinks Hofer Gilson & Lione (57) ABSTRACT

A polarizing beam splitter having a film made of a high-refractivity material and a film made of a low-refractivity material alternately stacked on a substrate. When an incidence angle with respect to a film surface in a particular wavelength is set as $\theta$ (°), the following conditional expressions are satisfied in the range of $40 \leq \theta \leq 50(°)$: $0.99 \leq Rs(45)/Rs(\theta) \leq 1.04$, $0.96 \leq Tp(45)/Tp(\theta) \leq 1.05$, where $Rs(\theta)$: reflectivity of polarized light s at a $\theta$ incidence; $Tp(\theta)$ transmissivity of polarized light p at a $\theta$ incidence angle; $Rs(45)$: reflectivity of polarized light s at a 45° incidence angle; and, $Tp(45)$ transmissivity of polarized light p at a 45° incidence angle. The transmissivity of the polarized light p does not decrease and the reflectivity of the polarized light s is nearly 100% with respect to even a broad angle region.

19 Claims, 4 Drawing Sheets

POLARIZING BEAM SPLITTER

The present application claims priority to Japanese Patent Application No. 2003-284722 filed Aug. 1, 2003, the entire content of which is hereby incorporated by reference.

BACKGROUND OF THE INVENTION

1. Field of the Invention

The present invention relates to a polarizing beam splitter, and more particularly to a polarizing beam splitter and a polarizing beam splitter film. The polarizing beam splitter may be suitable for, for example, a light pickup optical system using a blue laser, a projection optical system, or the like.

2. Description of the Related Art

A light pickup optical system for a blue region requires a polarizing beam splitter having polarization separation characteristics such that a transmissivity of a polarized light p and a reflectivity of a polarized light s in a wavelength region of around 405 nm are both nearly 100%. Currently, however, the divergence angle of a blue laser is significant. Therefore, when an ordinary polarizing beam splitter film is used, the transmissivity of the polarized light p is largely decreased due to varying the angle of incidence.

Japanese Unexamined Patent Publication Nos. 08-146218 and 09-184916 disclose polarizing beam splitters having predetermined polarization separation characteristics with respect to even a broad angle region, where a divergence angle of incident light is ±5° or above. For example, a polarizing beam splitter film disclosed in No. 09-184916 includes a first stack constituting $0.8 \times \lambda/4 \leq H \leq 1 \times \lambda/4$ and $0.7 \times \lambda/4 \leq L \leq 1 \times \lambda/4$, and a second stack constituting $1.3 \times \lambda/4 \leq H \leq 1.5 \times \lambda/4$ and $1.2 \times \lambda/4 \leq L \leq 1.5 \times \lambda/4$, where $\lambda$ is central wavelength of a split light, H is an optical film thickness of a film made of a high-refractivity material, and L is an optical film thickness of a film made of a low-refractivity material.

However, in the case of the polarizing beam splitter films disclosed in No. 08-146218 and No. 9-184916, an angle dependency of the polarized light s can only be controlled at approximately 20% in terms of the transmissivity, which shows insufficient polarization separation characteristics. Thus, when the polarizing beam splitter film is used in a light pickup optical system using a blue laser, projection optical system, or the like, there is a problem of a decreased light quantity.

SUMMARY OF THE INVENTION

A main object of the present invention is to provide a polarizing beam splitter and a polarizing beam splitter film capable of preventing a transmissivity of a polarized light p from decreasing while maintaining a reflectivity of a polarized light s at nearly 100% with respect to even a broad angle region, where a divergence angle of an incident light is ±5° or above.

In order to achieve the foregoing object and other objects as well, a polarizing beam splitter is disclosed having a multilayer structure, wherein a film made of a high-refractivity material and a film made of a low-refractivity are alternately stacked on a substrate, satisfying the following conditional expressions 1A and 1B in an entire range of $40 \leq \theta \leq 50$ (°) when an incidence angle with respect to a film surface in a particular wavelength is set to be $\theta$ (°).

$$0.99 \leq Rs(45)/Rs(\theta) \leq 1.04 \qquad \text{1A}$$

$$0.96 \leq Tp(45)/Tp(\theta) \leq 1.05 \qquad \text{1B}$$

providing that, $Rs(\theta)$: reflectivity of polarized light s at an incidence angle of $\theta$ $Tp(\theta)$: transmissivity of polarized light p at an incidence angle of $\theta$ $Rs(45)$: reflectivity of polarized light s at the incidence angle of 45°.

$Tp(45)$: transmissivity of polarized light p at the incidence angle of 45°.

The invention itself, together with further objects and attendant advantages, will best be understood by reference to the following detailed description taken in conjunction with the accompanying drawings.

BRIEF DESCRIPTION OF THE DRAWINGS

In the following description, like components are designated by like reference numbers throughout the several drawings.

DETAILED DESCRIPTION OF THE PREFERRED EMBODIMENTS

Hereinafter, a polarizing beam splitter and a polarizing beam splitter film embodied by the present invention are described referring to the drawings. Tables 1 and 2 respectively show multilayer films according to embodiments 1 and 2 (QWOT=$4 \cdot n \cdot d/\lambda$, d: physical film thickness, n: refractivity, $\lambda$: wavelength) as the polarizing beam splitter film according to the present invention. In the embodiment 1, a film made of a high-refractivity material, such as $TiO_2$ (titanium oxide), and a film made of a low-refractivity material, such as $SiO_2$ (silicon oxide), are alternately stacked to thereby form 33 layers on a glass substrate having the refractivity of 1.64 in the order of layer numbers. In the embodiment 2, a film made of a blended material TX including a high-refractivity material, such as $TiO_2$ (titanium oxide), and a film made of a low-refractivity material, such as $MgF_2$ (magnesium fluoride) or $SiO_2$ (silicon oxide), are alternately stacked to thereby form 25 layers on a glass substrate having the reflectivity of 1.64 in the order of the layer numbers.

In the case of the polarizing beam splitter film comprised of the film made of the high-refractivity material and the film made of the low-refractivity material alternately stacked as in the embodiments 1 and 2, it is preferable to satisfy the following conditional expressions 1A and 1B in an entire range of $40 \leq \theta \leq 50$ (°) when an incidence angle with respect to a film surface in a particular wavelength is set to be $\theta$ (°).

$$0.99 \leq Rs(45)/Rs(\theta) \leq 1.04 \qquad \text{1A}$$

$$0.96 \leq Tp(45)/Tp(\theta) \leq 1.05 \qquad \text{1B}$$

providing that, $Rs(\theta)$: reflectivity of polarized light s at an incidence angle of $\theta$ Tp(θ): transmissivity of polarized light p at an incidence angle of θ

Rs(45): reflectivity of polarized light s at the incidence angle of 45°

Tp(45): transmissivity of polarized light p at the incidence angle of 45°

Tables 3 and 4 show data according to respective embodiments in the case of wavelength λ=405 nm and 40≦θ≦50 (°): reflectivity Rs (θ) of polarized light s and transmissivity Tp (θ) of polarized light p, and data corresponding to parameters regulated in the conditional expressions 1A and 1B. As shown in tables 3 and 4, the embodiments 1 and 2 satisfy the conditional expressions 1A and 1B in the entire range of 40≦θ≦50 (°) Thus, when the conditional expressions 1A and 1B are satisfied in the entire range of 40≦θ≦50 (°), the transmissivity of the polarized light p can be prevented from decreasing while maintaining the reflectivity of the polarized light s at nearly 100% with respect to even a broad angle region, where a divergence angle of an incident light is ±5° or above.

As described, in order to satisfy the conditional expressions 1A and 1B in the entire range of 40≦θ≦50 (°), it is preferable to have at least a stack comprised of a film made of a high-refractivity material satisfying the following conditional expression 2A and a film made of a low-refractivity material satisfying the following conditional expression 2B alternately stacked in two or more repetitive cycles, providing that a pair of a layer of the film made of the high-refractivity material and a layer of the film made of the low-refractivity material constitutes a cycle.

$$0.7 \times \lambda/4 \leq H \leq 1 \times \lambda/4 \quad \text{2A}$$

$$1 \times \lambda/4 \leq L \leq 2 \times \lambda/4 \quad \text{2B}$$

providing that,

H: optical film thickness of film made of high-refractivity material

L: optical film thickness of film made of low-refractivity material

λ: central wavelength of split light

In the embodiment 1, a multilayer structure comprised of layers from a 16th layer through a 27th layer (layer No. 16-27) constitutes a stack. The stack is comprised of a film made of $TiO_2$ satisfying the conditional expression 2A and a film made of $SiO_2$ satisfying the conditional expression 2B alternately stacked in six repetitive cycles. In the embodiment 2, a multilayer structure comprised of layers from a 3rd layer through a 14th layer (layer No. 3-14) constitutes a stack. The stack is comprised of a film made of TX satisfying the conditional expression 2A and a film made of $SiO_2$ or $MgF_2$ satisfying the conditional expression 2B alternately stacked in six repetitive cycles. The adoption of such a configuration having a discriminative stack is capable of arranging an angle dependency of the polarized light s to invariably lead to the transmissivity of approximately 0%. Therefore, in an optical system, in which the polarized lights p and s are required to be sufficiently polarized and separated despite the divergence angle of the incident light being large (for example, light pickup optical system using blue laser, projection optical system, or the like), a quantity of light and optical performance can be dramatically improved.

Figure 1:
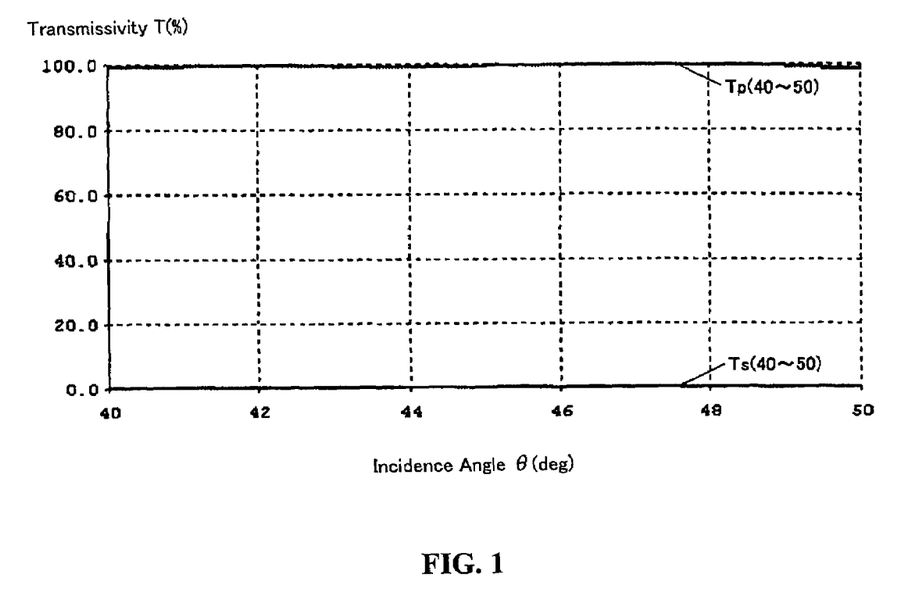
FIG. 1 is a graph showing a spectral characteristic with respect to an incidence angle according to an embodiment 1 of the present invention.
Figure 2:
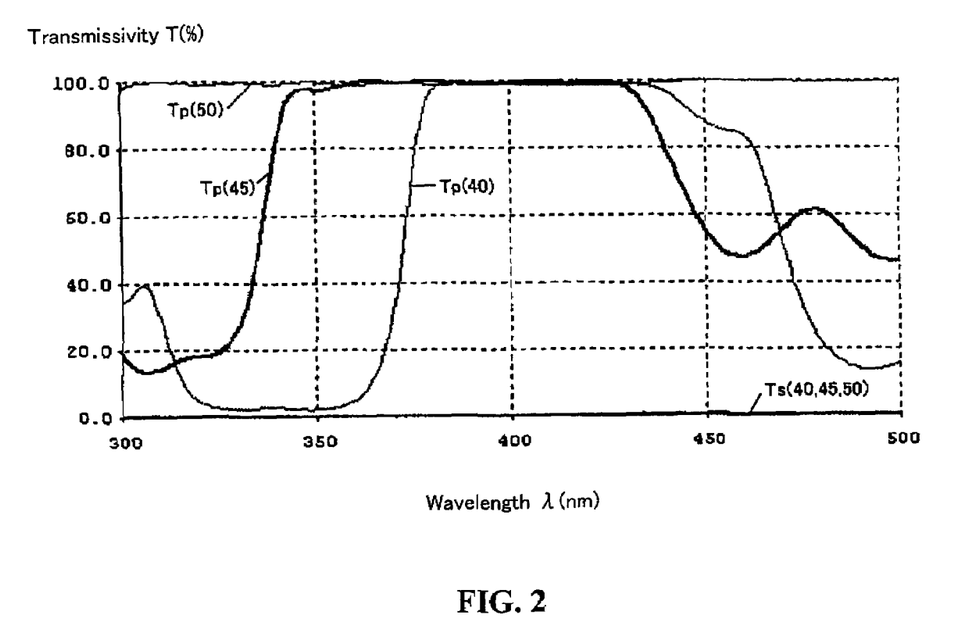
FIG. 2 is a graph showing a spectral characteristic with respect to a wavelength according to the embodiment 1.
Figure 3:
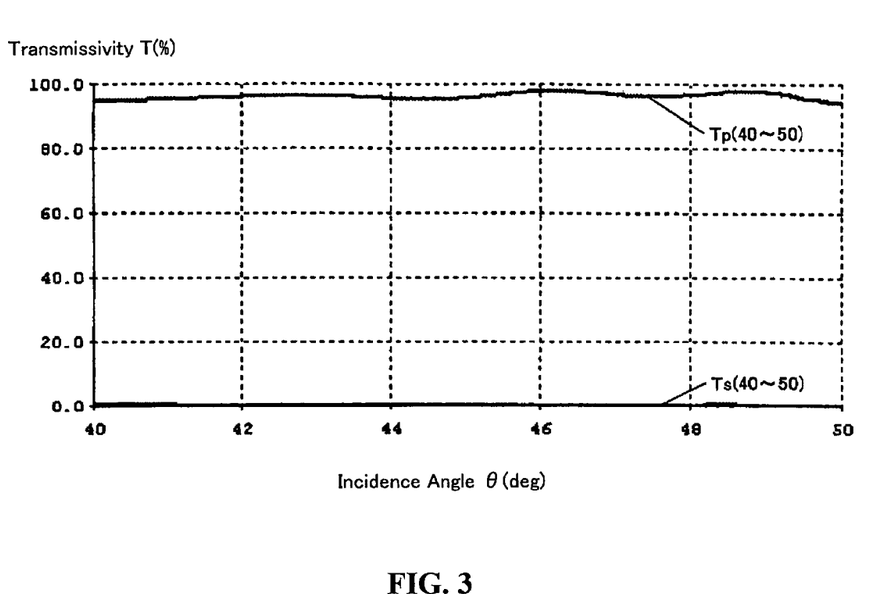
FIG. 3 is a graph showing a spectral characteristic with respect to an incidence angle according to an embodiment 2 of the present invention.
Figure 4:
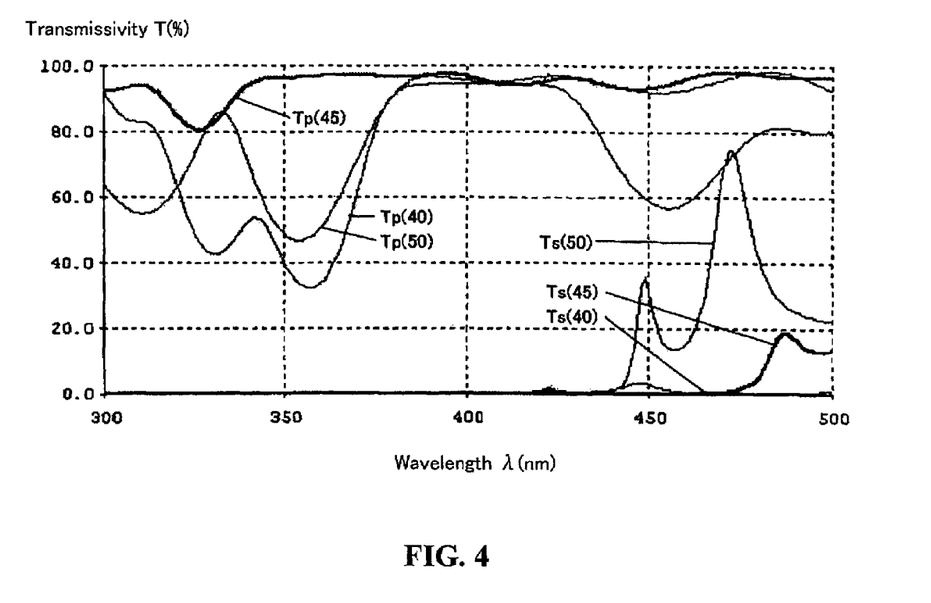
FIG. 4 is a graph showing a spectral characteristic with respect to a wavelength according to the embodiment 2.

FIGS. 1 and 2 show the polarization separation characteristics according to the embodiment 1 by means of the transmissivity T (%). FIG. 1 shows Tp (θ), which is the transmissivity of the polarized light p, and Ts (θ), which is the transmissivity of the polarized light s where the wavelength λ=405 nm and the incidence angle with respect to the film surface θ=40-50° FIG. 2 shows Tp (θ), which is the transmissivity of the polarized light p, and Ts (θ), which is the transmissivity of the polarized light s where the wavelength θ=300-500 nm and the incidence angle with respect to the film surface θ=40°, 45°, and 50°. FIGS. 3 and 4 show the polarization separation characteristics according to the embodiment 2 by means of the transmissivity T (%). FIG. 3 shows Tp (θ), which is the transmissivity of the polarized light p, and Ts (θ), which is the transmissivity of the polarized light s where the wavelength λ=405 nm and the incidence angle with respect to the film surface θ=40-50°. FIG. 4 shows Tp (θ), which is the transmissivity of the polarized light p and Ts (θ), which is the transmissivity of the polarized light s in where the wavelength λ=300-500 nm and the incidence angle with respect to the film surface θ=40°, 45°, and 50°. As shown in FIGS. 1 through 4, any of the embodiments have the polarization separation characteristics suitable for the polarizing beam splitter using a blue laser.

TABLE 1

Example 1

| Layer No. | Material | Physical film thickness d (nm) | QWOT (4 · n · d/λ) |
|---|---|---|---|
| 1 | $SiO_2$ | 131.17 | 1.900 |
| 2 | $TiO_2$ | 77.41 | 1.924 |
| 3 | $SiO_2$ | 122.38 | 1.773 |
| 4 | $TiO_2$ | 58.06 | 1.443 |
| 5 | $SiO_2$ | 129.01 | 1.869 |
| 6 | $TiO_2$ | 66.92 | 1.663 |
| 7 | $SiO_2$ | 110.94 | 1.607 |
| 8 | $TiO_2$ | 55.71 | 1.385 |
| 9 | $SiO_2$ | 110.13 | 1.595 |
| 10 | $TiO_2$ | 65.6 | 1.631 |
| 11 | $SiO_2$ | 140.19 | 2.031 |
| 12 | $TiO_2$ | 62.1 | 1.543 |
| 13 | $SiO_2$ | 95.96 | 1.390 |
| 14 | $TiO_2$ | 34.82 | 0.865 |
| 15 | $SiO_2$ | 65.77 | 0.953 |
| 16 | $TiO_2$ | 32.51 | 0.808 |
| 17 | $SiO_2$ | 78.93 | 1.143 |
| 18 | $TiO_2$ | 39.28 | 0.976 |
| 19 | $SiO_2$ | 87.41 | 1.266 |
| 20 | $TiO_2$ | 37.04 | 0.921 |
| 21 | $SiO_2$ | 82.48 | 1.195 |
| 22 | $TiO_2$ | 32.38 | 0.805 |
| 23 | $SiO_2$ | 84.14 | 1.219 |
| 24 | $TiO_2$ | 34.71 | 0.863 |
| 25 | $SiO_2$ | 88.87 | 1.287 |
| 26 | $TiO_2$ | 35.27 | 0.877 |
| 27 | $SiO_2$ | 79.75 | 1.155 |
| 28 | $TiO_2$ | 31.22 | 0.776 |
| 29 | $SiO_2$ | 280.41 | 4.062 |
| 30 | $TiO_2$ | 31.47 | 0.782 |
| 31 | $SiO_2$ | 89.89 | 1.302 |
| 32 | $TiO_2$ | 95.96 | 2.385 |
| 33 | $SiO_2$ | 69.04 | 1.000 |

TABLE 2

Example 2

| Layer No. | Material | Physical film thickness d (nm) | QWOT (4 · n · d/λ) |
|---|---|---|---|
| 1 | TX | 169.7 | 3.555 |
| 2 | $MgF_2$ | 263.76 | 3.608 |
| 3 | TX | 38.96 | 0.816 |
| 4 | $SiO_2$ | 94.45 | 1.368 |
| 5 | TX | 40.59 | 0.851 |

TABLE 2-continued

Example 2

| Layer No. | Material | Physical film thickness d (nm) | QWOT (4·n·d/λ) |
|---|---|---|---|
| 6 | MgF$_2$ | 106.31 | 1.454 |
| 7 | TX | 42.69 | 0.894 |
| 8 | SiO$_2$ | 97.01 | 1.405 |
| 9 | TX | 39.52 | 0.828 |
| 10 | SiO$_2$ | 87.8 | 1.272 |
| 11 | TX | 39.26 | 0.823 |
| 12 | MgF$_2$ | 103.89 | 1.421 |
| 13 | TX | 39.6 | 0.830 |
| 14 | SiO$_2$ | 107.87 | 1.563 |
| 15 | TX | 60.45 | 1.266 |
| 16 | MgF$_2$ | 179.6 | 2.457 |
| 17 | TX | 20.82 | 0.436 |
| 18 | SiO$_2$ | 195.14 | 2.827 |
| 19 | TX | 18.29 | 0.383 |
| 20 | MgF$_2$ | 177.36 | 2.426 |
| 21 | TX | 58.69 | 1.230 |
| 22 | SiO$_2$ | 122.25 | 1.771 |
| 23 | TX | 53.07 | 1.112 |
| 24 | SiO$_2$ | 364.74 | 5.283 |
| 25 | TX | 74.08 | 1.552 |

TABLE 3

Example 1

| θ (°) | Rs (θ) | Tp (θ) | (1A): Rs(45)/Rs(θ) | (1B): Tp(45)/Tp(θ) |
|---|---|---|---|---|
| 40 | 99.954 | 98.921 | 1.000 | 1.008 |
| 41 | 99.974 | 99.475 | 1.000 | 1.002 |
| 42 | 99.989 | 99.928 | 1.000 | 0.997 |
| 43 | 99.995 | 99.397 | 1.000 | 1.003 |
| 44 | 99.997 | 99.102 | 1.000 | 1.006 |
| 45 | 99.998 | 99.668 | 1.000 | 1.000 |
| 46 | 99.999 | 99.634 | 1.000 | 1.000 |
| 47 | 100.000 | 99.337 | 1.000 | 1.003 |
| 48 | 100.000 | 99.876 | 1.000 | 0.998 |
| 49 | 100.000 | 99.306 | 1.000 | 1.004 |
| 50 | 100.000 | 98.746 | 1.000 | 1.009 |

TABLE 4

Example 2

| θ (°) | Rs (θ) | Tp (θ) | (1A): Rs(45)/Rs(θ) | (1B): Tp(45)/Tp(θ) |
|---|---|---|---|---|
| 40 | 98.181 | 94.420 | 1.015 | 1.013 |
| 41 | 98.915 | 95.145 | 1.008 | 1.005 |
| 42 | 99.357 | 95.898 | 1.003 | 0.997 |
| 43 | 99.555 | 96.272 | 1.001 | 1.993 |
| 44 | 99.641 | 95.287 | 1.000 | 1.004 |
| 45 | 99.679 | 95.628 | 1.000 | 1.000 |
| 46 | 99.694 | 97.733 | 1.000 | 0.978 |
| 47 | 99.689 | 96.687 | 1.000 | 0.989 |
| 48 | 99.548 | 96.584 | 1.001 | 0.990 |
| 49 | 99.630 | 97.456 | 1.000 | 0.981 |
| 50 | 99.666 | 94.110 | 1.000 | 1.016 |

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A polarizing beam splitter comprising:
a substrate; and,
a multilayer structure having:
   a film made of a high-refractivity material; and,
   a film made of a low-refractivity material,
   the film made of a high-refractivity material and the film made of the low-refractivity material being alternately stacked on the substrate,
   the multilayer structure satisfying the following conditional expressions 1A, 1B, and 1C are satisfied in an entire range of 40≦θ≦50 (°) when an incidence angle with respect to a film surface in a particular wavelength is θ (°):

$$0.99 \leq Rs(45)/Rs(\theta) \leq 1.04 \qquad 1A$$

$$0.96 \leq Tp(45)/Tp(\theta) \leq 1.05 \qquad 1B$$

$$Tp > 90.00\% \qquad 1C$$

where,
Rs(θ): reflectivity of polarized light s at an incidence angle of θ;
Tp(θ): transmissivity of polarized light p at an incidence angle of θ;
Rs (45): reflectivity of polarized light s at the incidence angle of 45°; and,
Tp(45): transmissivity of polarized light p at the incidence angle of 45°.

2. A polarizing beam splitter as claimed in claim 1, wherein the multilayer structure has at least a stack comprising:
a film made of a high-refractivity material satisfying the following conditional expression 2A; and,
a film made of a low-refractivity material satisfying the following conditional expression 2B alternately stacked in at least two repetitive cycles, where:

$$0.7 \times \lambda/4 \leq H \leq 1 \times \lambda/4 \qquad 2A$$

$$1 \times \lambda/4 \leq L \leq 2 \times \lambda/4 \qquad 2B$$

where,
H: optical film thickness of film made of high-refractivity material;
L: optical film thickness of film made of low-refractivity material; and,
λ: central wavelength of split light.

3. A polarizing beam splitter as claimed in claim 2, wherein the high-refractivity material is TiO$_2$ and the low-refractivity material is SiO$_2$.

4. A polarizing beam splitter as claimed in claim 2, wherein the high-refractivity material is a blended material including TiO$_2$ and the low-refractivity material is selected from the group consisting of SiO$_2$ and MgF$_2$.

5. A polarizing beam splitter as claimed in claim 1, the multilayer structure further satisfying the condition that Tp≧94.11%.

6. A polarizing beam splitter as claimed in claim 5, wherein the multilayer structure has at least a stack comprising:
a film made of a high-refractivity material satisfying the following conditional expression 2A; and, a film made of a low-refractivity material satisfying the following conditional expression 2B alternately stacked in at least two repetitive cycles, where:

$$0.7 \times \lambda/4 \leq H \leq 1 \times \lambda/4 \quad \text{2A}$$

$$1 \times \lambda/4 \leq L \leq 2 \times \lambda/4 \quad \text{2B}$$

where,
H: optical film thickness of film made of high-refractivity material;
L: optical film thickness of film made of low-refractivity material; and,
λ: central wavelength of split light.

7. A polarizing beam splitter as claimed in claim 5, wherein the multilayer structure has at least a stack comprising:
a film made of a high-refractivity material satisfying the following conditional expression 2A; and,
a film made of a low-refractivity material satisfying the following conditional expression 2B alternately stacked in at least six repetitive cycles, where:

$$0.7 \times \lambda/4 \leq H \leq 1 \times \lambda/4 \quad \text{2A}$$

$$1 \times \lambda/4 \leq L \leq 2 \times \lambda/4 \quad \text{2B}$$

where,
H: optical film thickness of film made of high-refractivity material;
L: optical film thickness of film made of low-refractivity material; and,
λ: central wavelength of split light.

8. A polarizing beam splitter as claimed in claim 5, wherein the multilayer structure has at least a stack comprising:
a film made of a high-refractivity material satisfying the following conditional expression 2A; and,
a film made of a low-refractivity material satisfying the following conditional expression 2B alternately stacked in at least two repetitive cycles, where:

$$0.7 \times \lambda/4 \leq H \leq 1 \times \lambda/4 \quad \text{2A}$$

$$1 \times \lambda/4 \leq L \leq 2 \times \lambda/4 \quad \text{2B}$$

where,
H: optical film thickness of film made of high-refractivity material;
L: optical film thickness of film made of low-refractivity material; and,
λ: central wavelength of split light.

9. A polarizing beam splitter as claimed in claim 5, wherein the multilayer structure has at least a stack comprising:
a film made of a high-refractivity material satisfying the following conditional expression 2A; and,
a film made of a low-refractivity material satisfying the following conditional expression 2B alternately stacked in at least six repetitive cycles, where:

$$0.7 \times \lambda/4 \leq H \leq 1 \times \lambda/4 \quad \text{2A}$$

$$1 \times \lambda/4 \leq L \leq 2 \times \lambda/4 \quad \text{2B}$$

where,
H: optical film thickness of film made of high-refractivity material;
L: optical film thickness of film made of low-refractivity material; and,
λ: central wavelength of split light.

10. A polarizing beam splitter as claimed in claim 1, wherein the multilayer structure has at least a stack comprising:
a film made of a high-refractivity material satisfying the following conditional expression 2A; and,
a film made of a low-refractivity material satisfying the following conditional expression 2B alternately stacked in at least six repetitive cycles, where:

$$0.7 \times \lambda/4 \leq H \leq 1 \times \lambda/4 \quad \text{2A}$$

$$1 \times \lambda/4 \leq L \leq 2 \times \lambda/4 \quad \text{2B}$$

where,
H: optical film thickness of film made of high-refractivity material;
L: optical film thickness of film made of low-refractivity material; and,
λ : central wavelength of split light.

11. A polarizing beam splitter as claimed in claim 10, wherein the high-refractivity material is $TiO_2$ and the low-refractivity mater is $SiO_2$.

12. A polarizing beam splitter as claimed in claim 10, wherein the high-refractivity material is a blended material including $TiO_2$ and the low-refractivity material is selected form the group consisting of $SiO_2$ and $MgF_2$.

13. A polarizing beam splitter as claimed in claim 1, wherein a central wavelength of light being split by the polarizing beam splitter is 405 nm.

14. A polarizing beam splitter as claimed in claim 1, wherein the multilayer structure has at least a stack comprising:
a film made of a high-refractivity material satisfying the following conditional expression 2A; and,
a film made of a low-refractivity material satisfying the following conditional expression 2B alternately stacked in at least two repetitive cycles, where:

$$0.7 \times \lambda/4 \leq H \leq 1 \times \lambda/4 \quad \text{2A}$$

$$1 \times \lambda/4 \leq L \leq 2 \times \lambda/4 \quad \text{2B}$$

where,
H: optical film thickness of film made of high-refractivity material;
L: optical film thickness of film made of low-refractivity material; and,
λ: central wavelength of split light.

15. A polarizing beam splitter as claimed in claim 14, wherein the high-refractivity material is $TiO_2$ and the low-refractivity material is $SiO_2$.

16. A polarizing beam splitter as claimed in claim 14, wherein the high-refractivity material is a blended material including $TiO_2$ and the low-refractivity material is selected from the group consisting of $SiO_2$ and $MgF_2$.

17. A polarizing beam splitter as claimed in claim 1, wherein the multilayer structure has at least a stack comprising:
a film made of a high-refractivity material satisfying the following conditional expression 2A; and,
a film made of a low-refractivity material satisfying the following conditional expression 2B alternately stacked in at least six repetitive cycles, where:

$$0.7 \times \lambda/4 \leq H < 1 \times \lambda/4 \quad \text{2A}$$

$$1 \times \lambda/4 < L \leq 2 \times \lambda/4 \quad \text{2B}$$

where,
H: optical film thickness of film made of high-refractivity material;

L: optical film thickness of film made of low-refractivity material; and,

λ: central wavelength of split light.

18. A polarizing beam splitter as claimed in claim 17, wherein the high-refractivity material is TiO$_2$ and the low-refractivity mater is SiO$_2$.

19. A polarizing beam splitter as claimed in claim 17, wherein the high-refractivity material is a blended material including TiO$_2$ and the low-refractivity material is selected form the group consisting of SiO$_2$ and MgF$_2$.

* * * * *

UNITED STATES PATENT AND TRADEMARK OFFICE
CERTIFICATE OF CORRECTION

PATENT NO. : 7,289,267 B2 Page 1 of 1
APPLICATION NO. : 10/902321
DATED : October 30, 2007
INVENTOR(S) : Tomokazu Taguchi et al.

It is certified that error appears in the above-identified patent and that said Letters Patent is hereby corrected as shown below:

<u>In the Claims</u>

Column 8, in claim 11, line 21, after "refractivity" delete "mater" and substitute --material-- in its place.

Signed and Sealed this

Sixth Day of May, 2008

JON W. DUDAS
*Director of the United States Patent and Trademark Office*